United States Patent
Beer et al.

(10) Patent No.: US 11,685,050 B2
(45) Date of Patent: Jun. 27, 2023

(54) AUTONOMOUS SENSE AND GUIDE MACHINE LEARNING SYSTEM

(71) Applicant: Lawrence Livermore National Security, LLC, Livermore, CA (US)

(72) Inventors: N. Reginald Beer, Pleasanton, CA (US); David H. Chambers, Livermore, CA (US); Jeffrey Edward Mast, Loveland, CO (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 521 days.

(21) Appl. No.: 16/697,652

(22) Filed: Nov. 27, 2019

(65) Prior Publication Data

US 2021/0157337 A1    May 27, 2021

(51) Int. Cl.
*G05D 1/10* (2006.01)
*G05B 13/02* (2006.01)
(Continued)

(52) U.S. Cl.
CPC ........... *B25J 9/1676* (2013.01); *B64C 39/024* (2013.01); *G05B 13/02* (2013.01); *G05D 1/0088* (2013.01);
(Continued)

(58) Field of Classification Search
None
See application file for complete search history.

(56) References Cited

U.S. PATENT DOCUMENTS 10,139,820 B2 * 11/2018 Liu .................... H04W 4/44
10,168,695 B2 * 1/2019 Barnickel ............ G05D 1/0033
(Continued)

FOREIGN PATENT DOCUMENTS

WO    8201076 A1    4/1982
WO    9642020 A2    12/1996
(Continued)

OTHER PUBLICATIONS

NPL, Dikshroom, Nick, Simultaneous localization and mapping with the AR.Drone, University of Amsterdam, Master Thesis, (https://citeseerx.ist.psu.edu/viewdoc/download?doi=10.1.1.452.2358&rep=rep1&type=pdf) (Jul. 14, 2012).*
(Continued)

*Primary Examiner* — Jean Paul Cass
(74) *Attorney, Agent, or Firm* — Perkins Coie LLP

(57) ABSTRACT

A system for generating a machine learning system to generate guidance information based on locations of objects is provided. The system accesses training data that includes training time-of-arrival ("TOA") information of looks and guidance information for each look. The guidance information is based on a training collection of object locations. The TOA of a look represents, for each object location of a training collection of object locations, times between signals transmitted by transmitters and return signals received by receivers. The return signals represent signals reflected from an object at the object location. The system trains a machine learning system using the training data wherein the machine learning system inputs TOA information and outputs guidance information.

32 Claims, 6 Drawing Sheets

(51) Int. Cl.
  *G05D 1/00* (2006.01)
  *B64C 39/02* (2023.01)
  *G06T 7/70* (2017.01)
  *G06V 20/10* (2022.01)
  *B25J 9/16* (2006.01)
  *B64U 10/13* (2023.01)

(52) U.S. Cl.
  CPC ............ *G05D 1/101* (2013.01); *G06T 7/70* (2017.01); *G06V 20/10* (2022.01); *B64U 10/13* (2023.01); *B64U 2201/10* (2023.01); *G06T 2207/30252* (2013.01)

(56) References Cited

U.S. PATENT DOCUMENTS

| | | | |
|---|---|---|---|
| 10,183,732 B2 | 1/2019 | Celikkol et al. | |
| 10,916,969 B2* | 2/2021 | Britz | H02J 7/025 |
| 2010/0273504 A1* | 10/2010 | Bull | G01S 19/46 |
| | | | 455/456.1 |
| 2015/0316675 A1 | 11/2015 | Brizard et al. | |
| 2019/0334619 A1 | 10/2019 | Aoyama et al. | |

FOREIGN PATENT DOCUMENTS

| | | | |
|---|---|---|---|
| WO | WO-9642020 A2 * | 12/1996 | G01S 1/022 |
| WO | 2018125686 A2 | 7/2018 | |
| WO | 2018190834 A1 | 10/2018 | |

OTHER PUBLICATIONS

Kessler, A Machine Learning Library for Spacecraft Collision Avoidance, Aerospace Center of Excellence, University of Strathclyde, 75 Montrose Street, G1 1XJ, Glasgow, United Kingdom (https://strathprints.strath.ac.uk/76217/1/Acciarini_etal_ECSD_2021_A_machine_learning_library_for_spacecraft_collision_avoidance.pd.*

Uriot, Thomas, et al., Spacecraft collision avoidance challenge: Design and results of a machine learning competition, Astrodynamics, (https://link.springer.com/content/pdf/10.1007/S42064-021-0101-5.pdf)(Jun. 3, 2020).*

Hsu, Jeremy, Fishing for Space Junk, IEEE Spectrum (vol. 55, Issue: 6, Jun. 2018).*

Heidari, Mohammad, UDP identification and error mitigation in TOA based indoor localization system using neural network architecture, IEEE, IEEE Transactions on Wireless Communications, vol. 8, No. 7, Jul. 2009 (https://ieeexplore.ieee.org/stamp/stamp.jsp?tp=&arnumber=5165323&tag=1).*

Merz, Current Collision Avoidance service by ESA's Space Debris Office (2017).*

International Search Report and Written Opinion received in Application No. PCT/US20/62089, dated Sep. 28, 2021, 14 pages.

* cited by examiner

AUTONOMOUS SENSE AND GUIDE MACHINE LEARNING SYSTEM

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Unmanned aerial vehicles ("UAVs"), also referred to as unmanned aircraft systems ("UAS") or drones, are employed for a wide variety of applications such as military, scientific, commercial, humanitarian, and recreational applications. UAVs can be controlled in various ways that range from autonomous control by a navigation system to remote control by an operator. The navigation (or guidance) systems that provide autonomous control may be on board the UAVs or at ground stations that receive data from the UAVs and transmit instructions to the UAVs. A navigation system may simply navigate the UAV to a destination location along a specified route (e.g., a straight line) defined by Global Positioning System ("GPS") coordinates. More sophisticated navigation systems may interface with an onboard imaging system that collects images of the environment near the UAV. The navigation system may process the images to identify obstacles in the way of the UAV (e.g., buildings, mountains, and trees) and direct the UAV on a route to avoid the obstacles. When a UAV is under remote control of an operator, the UAV may have an onboard camera system that streams images of the environment to the operator. If the UAV does not have an onboard camera system, the operator needs to have a line of sight to the UAV. The operator may use various cockpit-type controls to guide the UAV.

Navigation systems that process images to identify obstacles can be very expensive and can add significant weight to a UAV. These navigation systems include camera systems, image processing systems, obstacle detection systems, route planning systems, and so on. A significant portion of the expense is driven by the computational and storage resources that are needed to process the images. Each image may require tens of megabytes for storage. To process the images in real time, the navigation systems may require high-end processing systems and custom-designed processors. The expense and weight of such navigation systems make them impractical for use by UAVs except in high-end military applications. As a result, UAVs for commercial and recreational use are remotely controlled based on having a line of sight to the UAVs.

Some UAV systems employ an on-board sensor array rather than an imaging device to identify object locations of objects (e.g., to be avoided by the UAV or are destinations of the UAV) in a field-of-view of the sensor array. The sensor array includes transmitters that transmit signals at intervals and receivers that collects return signals, which are transmitted signals reflected by objects. The sensor array may operate in monostatic mode or multistatic mode. In monostatic mode, the signal transmitted by a transmitter is received only by the receiver of that same transceiver. In multistatic mode, each transmitter transmits in sequence, but the return signal is collected by multiple receivers, generally all the receivers. When in multistatic mode, if the sensor array has M transmitters and N receivers the sensor array collects M×N return signals. Each return signal received by a receiver represents the reflection from each object in the field-of-view of the sensor array. For example, if there are three objects, the return signal received by a receiver will include three return pulses corresponding to the reflection of objects. The return pulses from objects that are closer to the sensor array will be received before those that are farther. The time-of-arrival of each return pulse represent the time between the transmitting of a signal and receiving of a return pulse. The set of M×N time-of-arrivals from each transmitter and receiver pair for each object is referred to as a "look."

Once a look is collected at an interval, a UAV system typically performs a computation to determine the object location of each object given a look. A guidance system can then input the object locations and generate a guidance instruction for the UAV. Unfortunately, it can be computationally very expensive to determine the object locations. The computational expense is due in part to the difficulty in determining which return pulses correspond to which objects. Algorithms to determine object locations may employ triangulation and solve complex minimization problems to accurately determine the object locations. Unfortunately, UAVs typically do not have the computational power to perform that computation at an interval rate that allows effective guidance.

DETAILED DESCRIPTION

Figure 1:
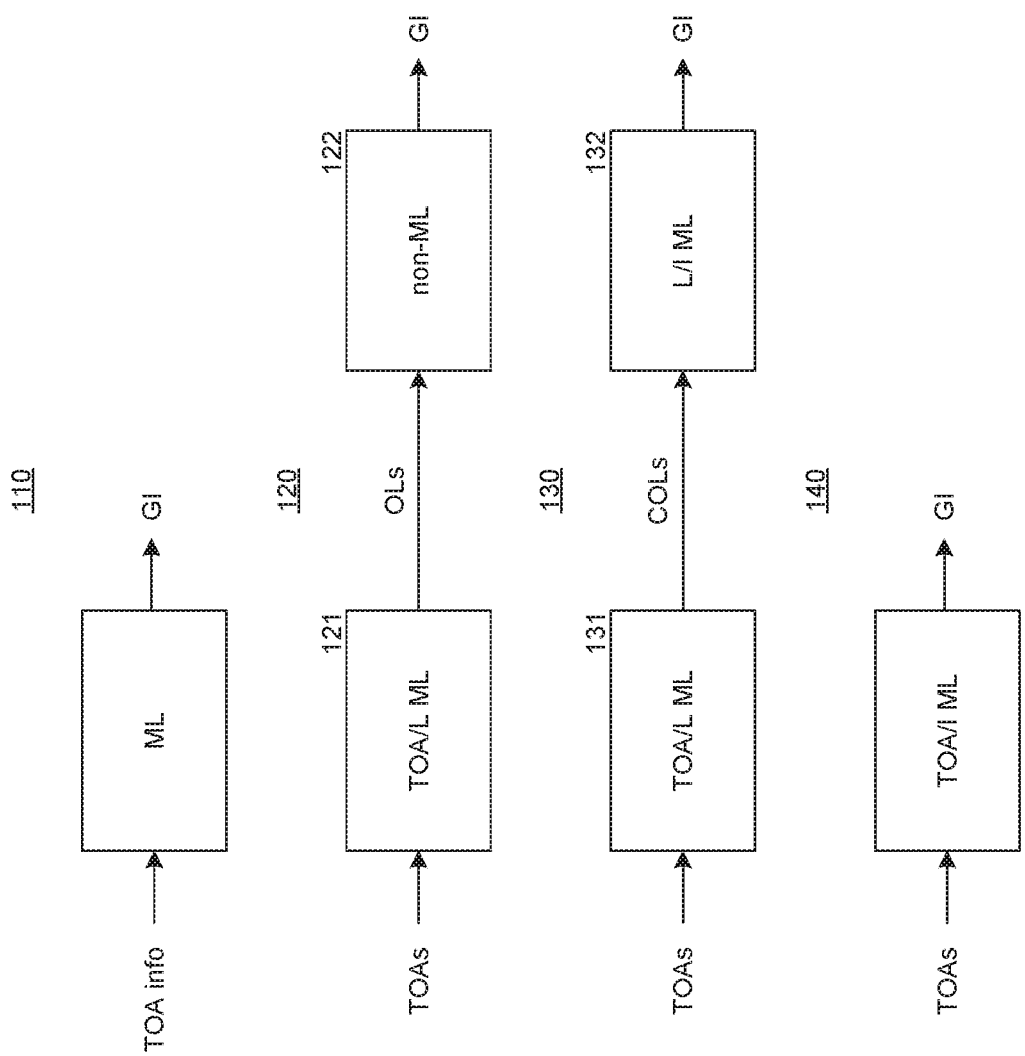
FIG. 1 is a block diagram that illustrates verse architectures of SGML system in some embodiments.

Methods and systems for employing a machine learning system to assisting in guiding movement of a platform based on time-of-arrivals ("TOAs") are provided. In some embodiments, a sense and guide machine learning ("SGML") system trains a machine learning system to provide guidance information based on TOA information. The guidance information may be object locations or guidance instructions, and the TOA information may be TOAs or object locations. The trained machine learning system may be deployed on a platform (e.g., UAV) with a sensor array of transmitters and receivers to determine object locations for use in guiding the platform. To train the machine learning system, the SGML system generates training data that includes TOA information labeled with guidance information. For example, the TOA information may be a look, and the labels may be a collection of object locations corresponding to the look. After the training data is generated, the SGML system performs the training of the machine learning system using the training data. The trained machine learning system can then be deployed (e.g., on a platform or remotely from a platform) to input TOAs and output guidance information. The guidance information can then be employed by a guidance system to guide the platform to avoid objects and/or to travel to an object. Although it may be computationally very expensive to generate the training data and train the machine learning system, the generating and training are performed off-line prior deployment for a platform. After training, the computations needed to determine guidance information are a very small fraction of that needed for the training and can be performed in real-time by an on-board computing system. Moreover, the on-board computing system can be relatively lightweight so that it can be installed on platforms where weight is a concern. The SGML system thus determines guidance information in a way that avoids the computational expense of prior systems that determined object locations, for example, by solving minimization problems.

In some embodiments, the SGML system trains a TOA/location machine learning system to determine object locations given a look and employs the trained TOA/location machine learning system to determine object locations. The trained TOA/location machine learning system may be deployed on a platform (e.g., UAV) with a sensor array of transmitters and receivers to determine object locations for use in guiding the platform. To train the TOA/location machine learning system, the SGML system generates training data that includes looks with each look being labeled with a collection of object locations. A collection of object locations may include one or more object locations. A look represents the expected TOAs of return signals given a collection of object locations of the label of the look. After the training data is generated, the SGML system performs the training of the TOA/location machine learning system using the training data. The trained TOA/location machine learning system can then be deployed (e.g., on a platform or remotely from a platform) to input observed looks and output an observed collection of object locations for each look. The observed collections of object locations can then be provided to a guidance system to generate guidance instructions to guide the platform to avoid objects and/or to travel to an object.

In some embodiments, the SGML system may employ a machine learning system to determine a guidance instruction based on TOAs. The SGML system trains a TOA/instruction machine learning system to generate guidance instructions given a look and employs the TOA/instruction machine learning system to guide movement of a platform. To train the TOA/instruction machine learning system, the SGML system generates training data the includes looks with each look being labeled with a guidance instruction. After the training data is generated, the SGML system performs the training of the TOA/guidance machine learning system using the training data. The trained TOA/guidance machine learning system can then be deployed (e.g., on a platform or remotely from a platform) to input observed looks and output a guidance instruction for each look. A guidance system on-board a platform can use the guidance instruction to guide movement of the platform. Like the TOA/location machine learning system, the TOA/guidance machine learning system can be trained off-line and the trained TOA/guidance machine learning system can be deployed to a platform to generate guidance instructions in real-time.

In some embodiments, the SGML system may employ a machine learning system to determine a guidance instruction based on a collection of object locations. The SGML system trains a location/instruction machine learning system to generate guidance instructions given a collection of object locations (e.g., determined by a TOA/location machine learning system) and employs the location/instruction machine learning system to guide movement of a platform. To train the TOA/instruction machine learning system, the SGML system generates training data that includes collections of object locations with each collection being labeled with a guidance instruction. After the training data is generated, the SGML system performs the training of the location/guidance machine learning system using the training data. The trained location/guidance machine learning system can then be deployed (e.g., on a platform or remotely from a platform) to input observed collections of object locations and output a guidance instruction for each collection. A guidance system on-board a platform can use the guidance instruction to guide movement of the platform. Like the TOA/location machine learning system, the location/guidance machine learning system can be trained off-line and the trained location/guidance machine learning system can be deployed to a platform to generate guidance instructions in real-time.

In some embodiments, the SGML system may employ various techniques to generate the training data and various machine learning techniques to train a machine learning system. For example, to generate training data, the SGML system may generate collections of object locations and calculate, for each transmitter and receiver pair a TOA based on distances between the transmitter and an object and the receiver and the object and the speed of the transmitted signal (e.g., speed of light or sound). The SGML system may employ a simulator to simulate the TOAs factoring the transmission medium, object shape, object reflectivity, object size, and so on. Alternatively, or additionally, the SGML system may calculate TOAs based on transmitted and return signals generated during actual movement of a platform and objects. For example, the platform and objects may move within a training pen. At each interval, the TOAs may be calculated by a computing system on board the platform or by a remote computing system based on return signal information provided by the platform. In addition, the SGML may employ an on-board or remote sensor to determine the actual object locations at each interval. These sensors may be a LIDAR system, a multicamera system, acoustic system, and so on. The machine learning techniques may include supervised and unsupervised learning techniques. The supervised learning technique may include a neural network, random forest, decision trees, support vector machines, and so on. The unsupervised learning techniques may include reinforcement learning.

In some embodiments, the SGML system may train a machine learning system based on series of looks of sequential intervals with each series having a label. For example, the SGML system may generate training data that includes guidance information as a label for each sequential pair of looks or collections of object locations. Once trained, the SGML system may be used to input a sequential pair of looks to generate guidance information. When training is based on series of looks, the SGML system may be considered to factor in object direction, velocity, and acceleration when determining guidance.

In some embodiments, the SGML system may be part of an object sense and avoid ("OSA") system on board a platform. The OSA system employ the machine learning system to determine guidance information that is provided to a flight controller system. The OSA system repeatedly uses the sensor array to collect sensor data of any objects in an object field (i.e., field of perception) around the platform. For example, the sensor array may transmit radar signals and receive the return signals that are reflected by the objects. Given guidance information, the flight controller controls the platform to move based on the guidance information.

The SGML system may support the guidance of a variety of autonomous vehicles ("AVs") that are autonomously driven. The AVs may include UAVs, unmanned ground vehicles ("UGVs"), unmanned underwater vehicles ("UUVs"), and unmanned space vehicles ("USVs"). These vehicles are "unmanned" in the sense that a person does not control the guidance of the vehicle. For UUVs, the sensor array may be sonar-based. For USVs, the SGML system may be particularly useful in helping a satellite avoid collisions with space debris or other satellites. The sensor array for USVs may employ a larger field of perception that for a UAV to encompass a wider approach of objects. In addition, the SGML system may be used with a guidance system that factors in both the guidance information provided by the SGML system and estimated locations of known space objects determined from orbital parameters (e.g., Keplerian elements) of the space objects to help in determining whether return signals correspond to an object. Also, although the SGML system is described primarily based on a field of perception that is in front of the platform, the field of perception may surround the platform. In such a case, the platform may include multiple sensor arrays to sense the entire area around the platform. Such a surrounding field of perception may be useful, for example, to sense and avoid objects (e.g., space debris) that are traveling toward the platform from the rear.

In some embodiments, the SGML system may be employed in conjunction with an auxiliary object sense and avoidance system such as that described in PCT Publication No. WO 2018/190834 A1, entitled "Attract-Repel Path Planner System for Collision Avoidance," filed on Apr. 12, 2017, which is hereby incorporated by reference. When objects are nearby a platform, such an auxiliary system may generate more precise guidance information based on a more accurate determination of object locations. When used in conjunction with such an auxiliary system, the SGML system may be employed while all objects are far, and the auxiliary system may be then employed while an object is not far.

The SGML system may provide guidance information so that a UAV takes evasive maneuvers to avoid an imminent collision with an object. For example, a predator UAV may be attempting to intercept a prey UAV before it reaches its target by colliding with the prey UAV. In such a case, the SGML system of the prey UAV may receive new guidance information resulting in a change in travel direction that is more than 90° away from the target direction because the predator UAV moved from left of the prey UAV to immediately in front of the prey UAV. If the prey UAV was traveling in the target direction, the sudden and significant change in the travel direction by the prey UAV is effectively an evasive maneuver to avoid colliding with the predator UAV. The new guidance information may result in the prey UAV rapidly ascending or descending or even reversing direction. If the prey UAV has a surrounding field of perception, then the SGML system can provide guidance information to effect evasive maneuvers even if the predator UAV approaches from the rear.

The SGML system may also be used to control movement in robotic systems such as fixed-base robotic systems and free-moving robotic systems. A fixed-base system, such as those used on production lines, typically includes a robot manipulator, an end effector (e.g., tool or gripper), and a safety interlock system. The fixed-base robotic system may be taught its motion using a teach pendant, which is typically a handheld unit used to program the trajectory of the robot. The safety interlock system may include force sensors to detect a collision or a light curtain sensor to disable the robot manipulator when a person (i.e., unsuspected object) is near the workspace of the fixed-base robotic system. The SGML system allows a fixed-base robotic system to detect intrusions and alter the trajectory of the robot manipulator. As a result, worker safety can be improved, and throughput of a capital-intensive production line can be maintained by avoiding costly shutdowns. In addition, use of the SGML system can eliminate the need to teach with a teach pendant and the need for force sensors or a light curtain sensor. The SGML system can be used to provide guidance information for picking up and placing parts for a production line. The SGML system can be used to direct the end effector to a target location of a part within the cell of the fixed-base system for pickup while avoiding neighboring cells, for example, by controlling the roll, pitch, and yaw of the robot manipulator. The SGML system can then be used to direct the end effector to a target that is the desired location of a part on a production line. The output of the SGML system can be used to generate and issue commands to the robot manipulator to slow down, change orientation, or signal readiness to dock, interlock, mate, operate a tool, and so on. A sensor array may be located on the robot manipulator near the end effector or at a fixed location.

Free-moving robotic systems include servant robots and companion robots. The SGML system can be used to generate guidance information when a robot is moving parts or supplies within a hospital, production line, shipping facility, and so on. The payload of the free-moving robotic system may be a tool, part, supply, sensing system, interactive communicator (for a companion robot), and so on. The guidance information allows the robot to move while avoiding stationary and moving objects. A sensor array may be located on the front of a free-moving robotic system.

In some embodiments, the SGML system may be employed to design an architecture of a sensor array that satisfies accuracy, power consumption, weight, and so on tradeoffs. Although a sensor array with more transmitters and receivers will in general result in more accuracy, a sensor array with a large number of transmitters and receivers may be too heavy or power-hungry for a platform. To evaluate architectures for a sensor array, the SGML system may be adapted to process TOAs resulting from actual object locations for that architecture. The SGML system may then be used to determine a collection of object locations. An accuracy metric may be calculated that indicates the similarity between the actual object locations and the collections of object locations. The accuracy metrics, power consumption, and weights of the architectures can be evaluated to identify an appropriate architecture. The architectures may include different numbers and types, locations, location curvatures, different beam patterns (e.g., main and side lobe patterns), and so on of transmitters and/or receivers. As an example, when a phased-array radar sensor is employed that includes a fixed number of transmitters and receivers, the SGML system may be employed to evaluate enabling of different numbers and/or positions of transmitters and receivers based on a power consumption and accuracy tradeoff.

FIG. 1 is a block diagram that illustrates various architectures of SGML system in some embodiments. Architecture 110 illustrates the overall architecture of the machine learning systems. The machine learning architectures input TOA information, such as TOAs or a collection of object locations associated with the look, and output guidance information, such as a collection of object locations or guidance instructions. Architecture 120 includes TOA/location machine learning system 121 and a non-machine learning system 122. The TOA/location machine learning system inputs the TOAs of the look and outputs a collection of object locations. The non-machine learning system inputs a collection of object locations and outputs a guidance instruction. The non-machine learning system may be a conventional system used in flight control to determine guidance instructions based on object locations. Architecture 130 includes a TOA/location machine learning system 131 and location/instruction machine learning system 132. The TOA/location machine learning system 131 operates in the same manner as TOA/location machine learning system 121. The location/instruction machine learning system inputs a collection of locations and outputs a guidance instruction. The location/instruction machine learning system may be employed independently of a machine learning system that outputs collections of object locations such as a conventional flight system that inputs signals and outputs object locations. Architecture 140 includes a TOA/instruction machine learning system. The TOA/instruction machine learning system inputs TOAs and outputs a guidance instruction.

The computing devices and systems on which the SGML system may be implemented may include a central processing unit, input devices, output devices (e.g., display devices and speakers), storage devices (e.g., memory and disk drives), network interfaces, graphical processing units, tensor processing units, field programmable gate arrays (FPGAs), accelerometers, cellular radio link interfaces, global positioning system devices, and so on. The input devices may include sensors, keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems, such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the SGML system. The data transmission media is used for transmitting data via transitory, propagating signals or carrier waves (e.g., electromagnetism) via a wired or wireless connection.

The SGML system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the system may be implemented in hardware using, for example, an application-specific integrated circuit ("ASIC").

Figure 2:
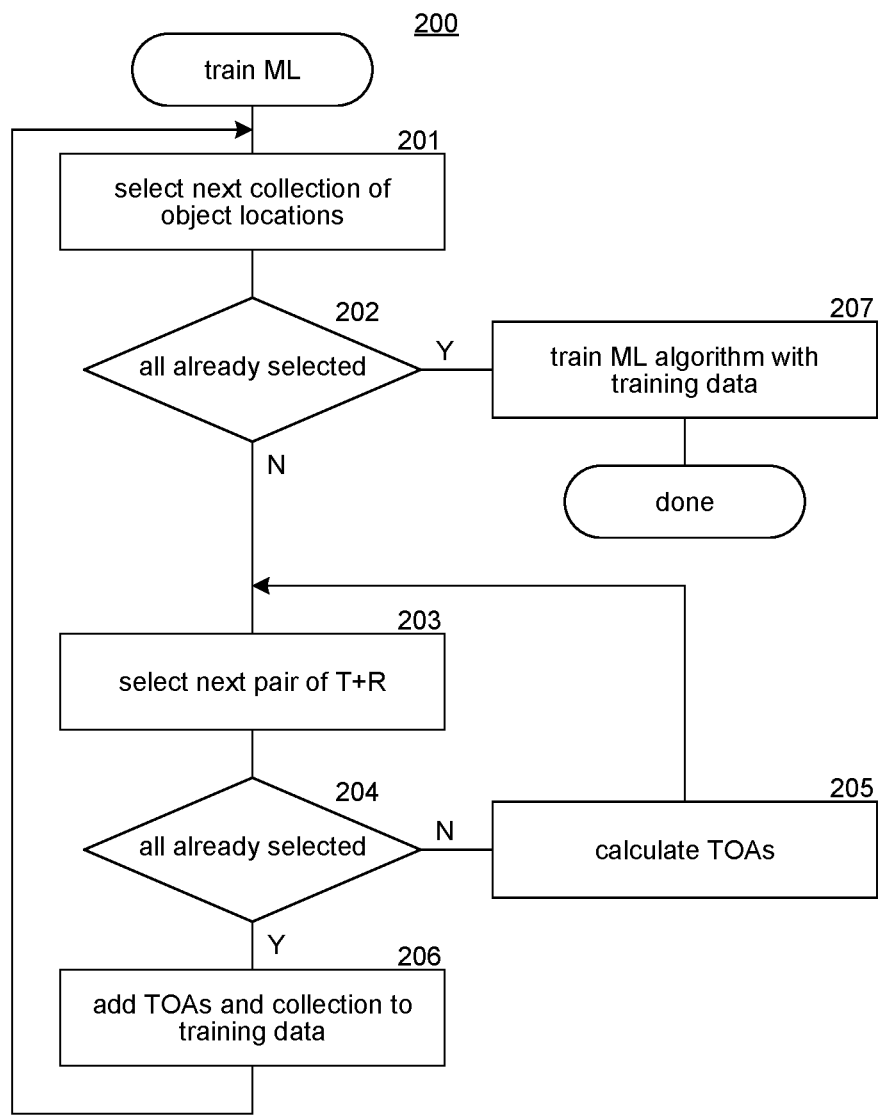
FIG. 2 is a flow diagram that illustrates the processing of a train TOA/location ML component of the SGML system in some embodiments.

FIG. 2 is a flow diagram that illustrates the processing of a train TOA/location ML component of the SGML system in some embodiments. A train TOA/location ML component 200 trains a machine learning algorithm using training data that includes TOAs of looks and corresponding collections of objects as training data. The training data may be generated based on the simulation of the TOAs given object locations or given actual TOAs and object locations of actual objects collected as a platform moves relative to the actual objects. In block 201, the component selects the next collection of object locations. In decision block 202, if all the collections have already been selected, then the component continues at block 207, else the component continues at block 203. In block 203, the component selects the next pair of transmitters and receivers of the architecture. In decision block 204, if all the pairs of transmitters and receivers for the architecture have already been selected, then the component continues at block 206, else the component continues at block 205. In block 205, the component calculates the TOAs for the receiver of the selected pair based on return signals from each object location and then loops to block 203 to select the next pair of transmitters and receivers. In block 206, the component adds the TOAs and a collection of objects locations to the training data and loops to block 201 to select the next collection of object locations. In block 207, the component trains the machine learning algorithm using the training data and completes. The SGML system may train a TOA/instruction ML system in a similar manner except that in block 206, TOAs and instructions are the training data. The SGML system trains a location/instruction machine learning system using training data that includes collections of object locations and corresponding guidance instructions. The object locations may be simulated object locations or actual object locations.

Figure 3:
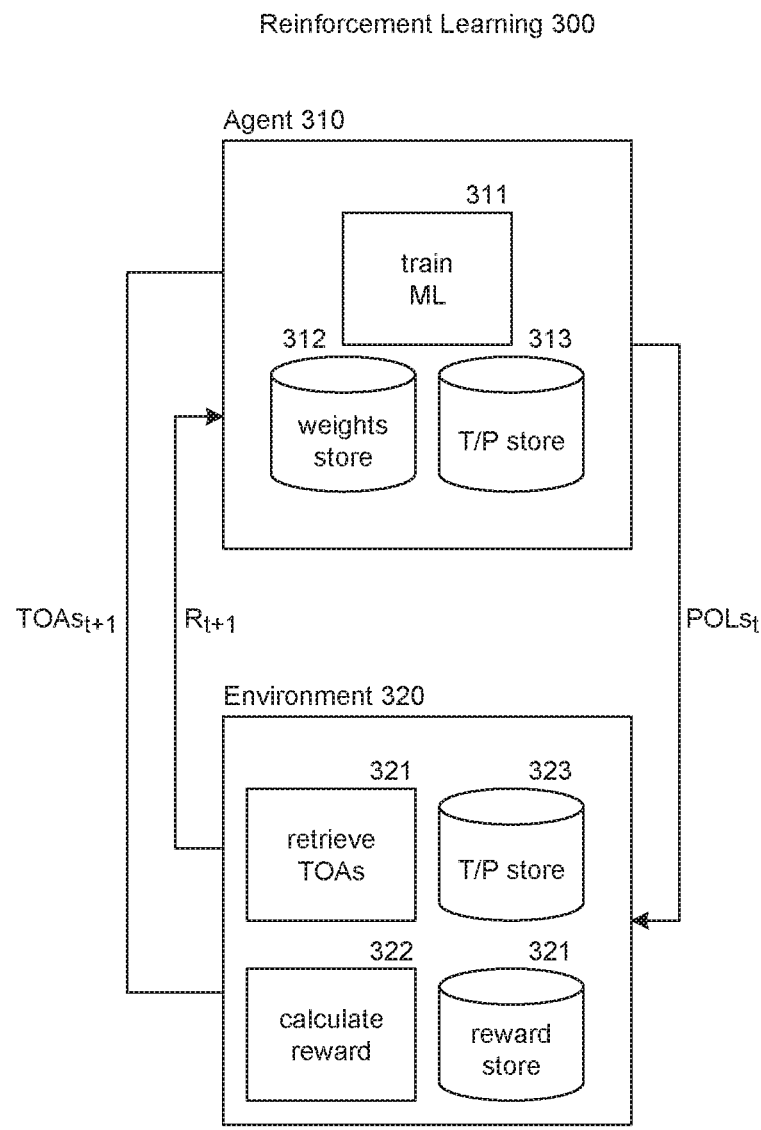
FIG. 3 is a block diagram that illustrates the components of the reinforcement learning component of the SGML system in some embodiments.

FIG. 3 is a block diagram that illustrates the components of the reinforcement learning component of the SGML system in some embodiments. The reinforcement learning component 300 includes an agent system 310 and an environment system 320. The agent system includes a train ML component 311, a weights store 312, and a TOAs/predicted object location store 313. The environment system includes a retrieve TOAs component 321, a calculate reward component 322, and TOAs/actual object location store 323, and reward store 324. The agent system inputs TOAs of looks and rewards provided by the environment system. The train ML component of the agent system then adjusts weights (stored in the weights store) associated with the machine learning algorithm based on the rewards and TOAs and predicted object locations. The agent system then applies the weights to the TOAs to generate predicted object locations, stores the TOAs and predicted object locations, and provides the predicted object locations to the environment system. Upon receiving predicted object locations, the retrieve TOAs component retrieves from the TOA/actual object location store the TOAs of a look and provides those TOAs as current TOAs to the agent. The calculate reward system inputs the predicted object locations and calculates a reward based on similarity between the predicted object locations and the actual object locations corresponding to the prior TOAs provided to the agent component. The rewards component may store information relating to the rewards for use in calculating subsequent rewards.

Figure 4:
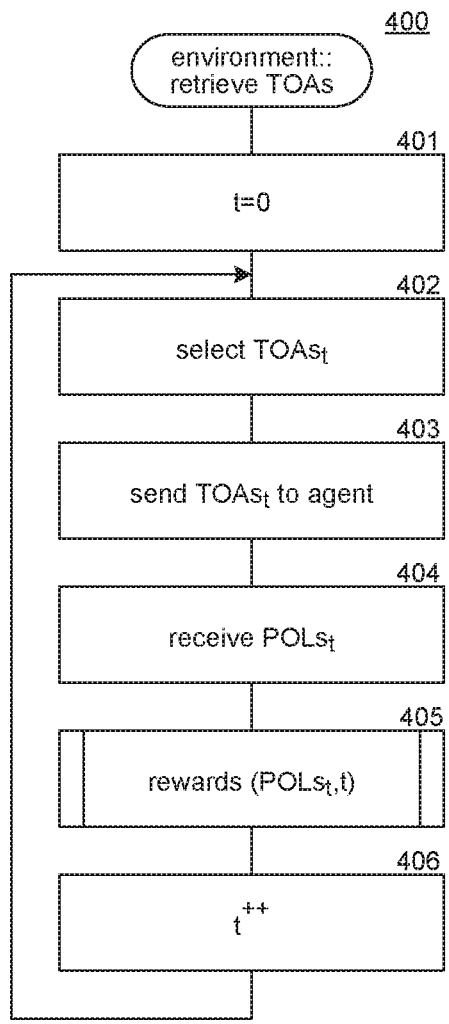
FIG. 4 is a flow diagram that illustrates the processing of a retrieve TOAs component of the environment system in some embodiments.

FIG. 4 is a flow diagram that illustrates the processing of a retrieve TOAs component of the environment system in some embodiments. The retrieve TOAs component 400 loops sending TOAs to the agent system and receiving predicted object locations from the agent system. In block 401, the component initializes an interval count. In block 402, the component selects TOAs for the interval. In block 403, the component sends the selected TOAs to the agent system. In block 404, the component waits to receive the predicted object locations for the current interval and provides the predicted object locations to the calculate rewards component. In block 405, the component invokes the rewards component passing an indication of the predicted object locations for the current interval and an indication of the interval. In block 406, the component increments the interval and loops to block 402 to selected TOAs for the now current interval.

Figure 5:
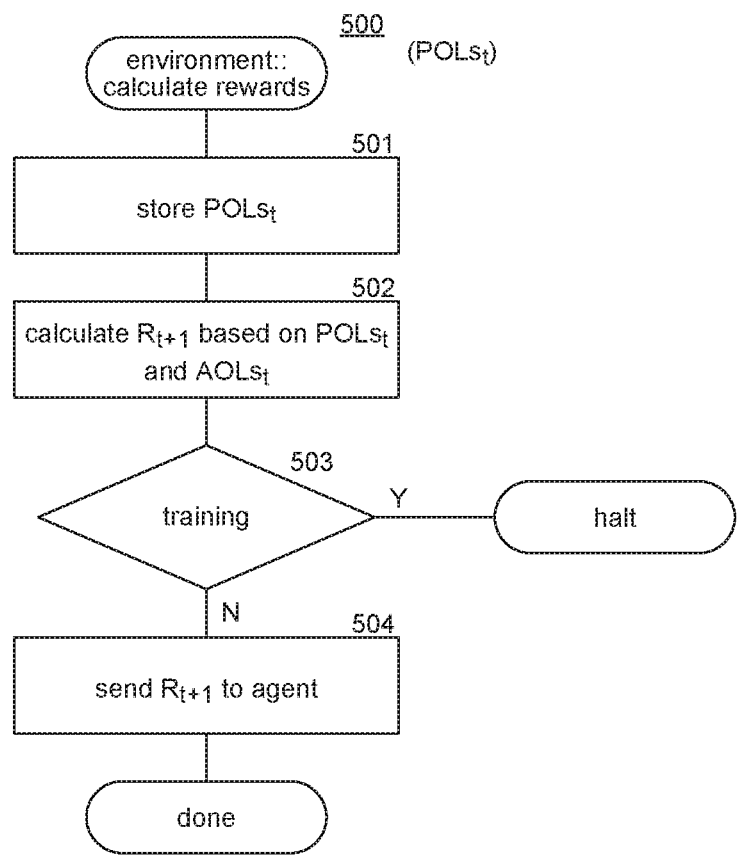
FIG. 5 is a flow diagram that illustrates the processing of a calculate rewards component of the environment system in some embodiments.

FIG. 5 is a flow diagram that illustrates the processing of a calculate rewards component of the environment system in some embodiments. The calculate rewards component 500 is passed the predicted object locations for the current interval and an indication of the current interval and calculates a reward. In block 501, the component stores the predicted object location. In block 502, the component calculates a reward based on the predicted object locations and the actual object locations for the current time interval and, in some embodiments, earlier time intervals. In decision block 503, if the machine learning algorithm is trained, then the component completes the processing of the reinforcement learning system. In block 504, the component sends the reward for the next interval to the agent system and then completes.

Figure 6:
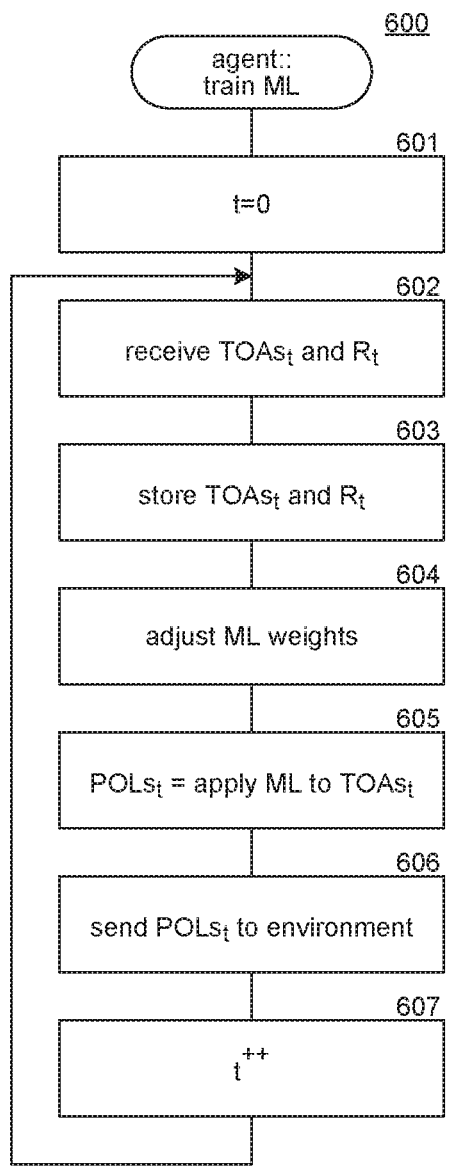
FIG. 6 illustrates the processing of a train ML component of the agent system in some embodiments.

FIG. 6 illustrates the processing of a train ML component of the agent system in some embodiments. The train ML component 600 receives TOAs, adjusts weights, and generates predicted object locations. In block 601, the component initializes the interval. In block 602, the component receives TOAs and a reward for the current interval. In blocks 603, the component stores the TOAs and the reward. In block 604, the component adjusts the machine learning weights based on the reward. In block 605, the component applies the machine learning algorithm to the TOAs to generate predicted object locations. In block 606, the component sends the predicted object locations to the environment system. In block 607, the component increments the interval, loops to block 602, and waits to receive the TOAs and reward for the interval.

The following paragraphs describe various embodiments of aspects of the SGML system. An implementation of the SGML system may employ any combination of the embodiments. The processing described below may be performed by a computing device with a processor that executes computer-executable instructions stored on a computer-readable storage medium that implements the SGML system.

In some embodiments, a method performed by one or more computing systems for generating a machine learning system to generate guidance information based on locations of objects is provided. The method accesses training data that includes for a plurality of looks, training TOA information of the look and guidance information for the look. The guidance information is based on a training collection of object locations. The TOAs of a look represent, for each object location of a training collection of object locations, times between signals transmitted by transmitters and return signals received by receivers. The return signals represent signals reflected from an object at the object location. The method trains a machine learning system using the training data. The machine learning system inputs TOA information and outputs guidance information. In some embodiments, the training TOA information represents the TOAs of a look and the guidance information is a collection of object locations for each look. In some embodiments, the training TOA information represents a training collection of object locations corresponding to TOAs of a look and the guidance information is a guidance instruction. In some embodiments, the training TOA information represents TOAs of a look and the guidance information is a guidance instruction. In some embodiments, the object locations in a training collection of object locations represent locations relative to an array of transmitters and receivers. In some embodiments, a guidance system of a platform with transmitters and receivers employs the machine learning system to input TOA information as the platform travels and output guidance information. In some embodiments, the guidance system determines a guidance instruction for the platform based on the TOA information. In some embodiments, the platform is a component of a robot control system. In some embodiments, the platform is a satellite and the object locations are locations of objects in space. In some embodiments, the platform is an unmanned vehicle. In some embodiments, the training TOA information is calculated during movement of a platform with transmitters and receivers through a volume of objects and object locations of the training collections are identified by an actual object location sensor. In some embodiments, the actual object location sensor is mounted on the platform. In some embodiments, the actual object location sensor is external to the platform. In some embodiments, the method generates TOA information by simulating time-of-arrivals for training collections of object locations. In some embodiments, the machine learning system is based on reinforcement learning. In some embodiments, the machine learning system is based on supervised learning.

In some embodiments, a method performed by one or more computing systems to guide movement of a platform. The method, for each of a plurality of intervals, receives TOA information derived from TOAs determined based on times between signals transmitted by transmitters and return signals received by receivers. A return signal is reflected from an observed object at an object location. The method determines guidance information by applying a machine learning system that inputs TOA information and outputs guidance information. The machine learning system having been trained using training data that includes TOA information and guidance information. In some embodiments, the TOA information is the TOAs of a look and the guidance information is a collection of object locations for each look. In some embodiments, the TOA information is a collection of object locations corresponding to TOAs of a look and the guidance information is a guidance instruction. In some embodiments, the TOA information is TOAs of a look and the guidance information is a guidance instruction. In some embodiments, the machine learning system includes a first machine learning system that inputs TOAs of a look and outputs a collection of object locations and a second machine learning system that inputs a collection of object locations and output a guidance instruction. In some embodiments, the platform is a component of a robot control system. In some embodiments, the platform is a satellite and the object locations are locations of objects in space. In some embodiments, the platform is an unmanned vehicle. In some embodiments, the method guides the platform based on the guidance instructions.

In some embodiments, a method performed by one or more computing system for evaluating an architecture of a sensor array for a platform is provided. The method accesses a plurality of architectures of sensor arrays. An architecture specifies number and positions of transmitters and receivers of the sensor array. For each of a plurality of architectures, the method generates an architecture metric. To generate an architecture metric, the method, for each of a plurality of TOAs of looks and an evaluation collection of object locations, applies a machine learning system that inputs the TOAs of the look and generates an estimated collection of object locations and generates a metric based on similarity of object locations of the evaluation collection and the estimated collection, where the machine learning system has been trained using training data that includes TOAs of looks and for each look an evaluation collection of object locations. The method then generates an architecture metric based on the metrics generated for the architecture. In some embodiments, the architecture further specifies curvature of a sensor array. In some embodiments, the architecture metric is further based on size or weight of a sensor array. In some embodiments, the sensor array is a phased sensor array. In some embodiments, an architecture further specifies a beam pattern of a transmitter.

In some embodiments, one or more computing systems to guide movement of a platform are provided. The one or more computing systems include one or more computer-readable storage mediums for storing computer-executable instructions for controlling the one or more computing systems and one or more processors for executing the computer-executable instructions stored in the one or more computer-readable storage mediums. The instructions, for each of a plurality of intervals, receive TOA information derived from TOAs determined based on times between signals transmitted by transmitters and return signals received by receivers and generate guidance information by applying a machine learning system that inputs TOA information and outputs guidance information. The machine learning system is trained using training data that includes TOA information and guidance information. In some embodiments, the TOA information is the TOAs of a look and the guidance information is a collection of object locations for each look. In some embodiments, the TOA information is a collection of object locations corresponding to TOAs of a look and the guidance information is a guidance instruction. In some embodiments, the TOA information is TOAs of a look and the guidance information is a guidance instruction. In some embodiments, the machine learning system includes a first machine learning system that inputs TOAs of a look and outputs a collection of object locations and a second machine learning system that inputs a collection of object locations and output a guidance instruction. In some embodiments, the platform is a component of a robot control system. In some embodiments, the platform is a satellite and the object locations are locations of objects in space. In some embodiments, the platform is an unmanned vehicle. In some embodiments, the instructions further guide the platform based on the guidance information.

In some embodiments, one or more computing systems for evaluating an architecture of a sensor array for a platform are provided. The one or more computing systems include one or more computer-readable storage mediums for storing computer-executable instructions for controlling the one or more computing systems and one or more processors for executing the computer-executable instructions stored in the one or more computer-readable storage mediums. The instructions access an architecture that specifies number and positions of transmitters and receivers of the sensor array. For each of a plurality of TOAs of looks and an evaluation collection of object locations, the instructions apply a machine learning system that inputs the TOAs of the look and generates an estimated collection of object locations. The instructions also generate a metric based on similarity of object locations of the evaluation collection and the estimated collection. The instructions then generate an architecture metric based on the metrics generated for the architecture. In some embodiments, the machine learning system is trained using training data that includes TOAs of looks and for each look an evaluation collection of object locations. In some embodiments, the architecture further specifies curvature of a sensor array or a beam pattern of a transmitter. In some embodiments, the architecture metric is further based on size or weight of a sensor array. In some embodiments, the sensor array is a phased sensor array.

In some embodiments, one or more computing systems for generating a machine learning system to generate guidance information based on locations of objects are provided. The one or more computing systems include one or more computer-readable storage mediums for storing computer-executable instructions for controlling the one or more computing systems and one or more processors for executing the computer-executable instructions stored in the one or more computer-readable storage mediums. The instructions access training data that includes, for each of a plurality of looks, training TOA information of the look and guidance information for the look. The instructions train a machine learning system using the training data wherein the machine learning system inputs TOA information and outputs guidance information. In some embodiments, the guidance information is based on a training collection of object locations. The TOAs of a look represent, for each object location of a training collection of object locations, times between signals transmitted by transmitters and return signals received by receivers. The return signals represent signals reflected from an object at the object location. In some embodiments, the training TOA information is generated during movement of a platform with transmitters and receivers through a volume of objects and object locations of the training collections are identified by an actual object location sensor. In some embodiments, the TOA information represents the TOAs of a look and the guidance information is a collection of object locations for each look. In some embodiments, the training TOA information represents a training collection of object locations corresponding to TOAs of a look and the guidance information is a guidance instruction. In some embodiments, the training TOA information represents TOAs of a look and the guidance information is a guidance instruction. In some embodiments, The following paragraphs describe various embodiments of aspects of the SGML system. An implementation of the SGML system may employ any combination of the embodiments. The processing of the methods described below may be performed by a computing device with a processor that executes computer-executable instructions stored on a computer-readable storage medium that implements the SGML system.

The invention claimed is:

1. A method performed by one or more computing systems for generating a machine learning system to generate guidance information based on locations of objects, the method comprising:
accessing training data that includes a plurality of training times-of-arrival (TOAs) for each of a plurality of looks and guidance information for the plurality of looks, the guidance information being based on a training collection of object locations, wherein the TOAs of a look of the plurality of looks represent, for each object location of the training collection of object locations, a time between a signal transmitted by each of a plurality of transmitters of a sensor array on a platform that is not located at any of the object locations and a corresponding return signal received by each of a plurality of receivers of the sensor array on the platform, wherein return signals corresponding to an object location of the training collection of object locations represent signals transmitted by the plurality of transmitters of the sensor array on the platform and subsequently reflected from an object at the object location; and training a machine learning system using the training data wherein the machine learning system inputs TOA information and outputs guidance information.

2. The method of claim 1 wherein the training TOA information represents the TOAs of a look and the guidance information is a collection of object locations for each look.

3. The method of claim 1 wherein the training TOA information represents a training collection of object locations corresponding to TOAs of a look and the guidance information is a guidance instruction.

4. The method of claim 1 wherein the training TOA information represents TOAs of a look and the guidance information is a guidance instruction.

5. The method of claim 1 wherein object locations in a training collection of object locations represent locations relative to an array of transmitters and receivers.

6. The method of claim 1 wherein a guidance system of a platform with transmitters and receivers employs the machine learning system to input TOA information as the platform travels and output guidance information.

7. The method of claim 6 wherein the guidance system determines a guidance instruction for the platform based on the TOA information.

8. The method of claim 6 wherein the platform is a component of a robot control system.

9. The method of claim 6 wherein the platform is a satellite and the object locations are locations of objects in space.

10. The method of claim 6 wherein the platform is an unmanned vehicle.

11. The method of claim 1 wherein the training TOA information is calculated during movement of a platform with transmitters and receivers through a volume of objects and object locations of the training collections are identified by an actual object location sensor.

12. The method of claim 11 wherein the actual object location sensor is mounted on the platform.

13. The method of claim 11 wherein the actual object location sensor is external to the platform.

14. The method of claim 1 further comprising generating TOA information by simulating time-of-arrivals for training collections of object locations.

15. The method of claim 1 wherein the machine learning system is based on reinforcement learning.

16. The method of claim 1 wherein the machine learning system is based on supervised learning.

17. One or more computing systems comprising one or more computer-readable storage mediums storing computer-executable instructions for generating a machine learning system to generate guidance information based on locations of objects, such that execution of the instructions causes operations comprising:

accessing training data that includes a plurality of training times-of-arrival (TOAs) for each of a plurality of looks and guidance information for the plurality of looks, the guidance information being based on a training collection of object locations, wherein the TOAs of a look of the plurality of looks represent, for each object location of the training collection of object locations, a time between a signal transmitted by each of a plurality of transmitters of a sensor array on a platform that is not located at any of the object locations and a corresponding return signal received by each of a plurality of receivers of the sensor array on the platform, wherein return signals corresponding to an object location of the training collection of object locations represent signals transmitted by the plurality of transmitters of the sensor array on the platform and subsequently reflected from an object at the object location; and training a machine learning system using the training data wherein the machine learning system inputs TOA information and outputs guidance information.

18. The one or more computing systems of claim 17 such that the training TOA information represents the TOAs of a look and the guidance information is a collection of object locations for each look.

19. The one or more computing systems of claim 17 such that the training TOA information represents a training collection of object locations corresponding to TOAs of a look and the guidance information is a guidance instruction.

20. The one or more computing systems of claim 17 such that the training TOA information represents TOAs of a look and the guidance information is a guidance instruction.

21. The one or more computing systems of claim 17 such that object locations in a training collection of object locations represent locations relative to an array of transmitters and receivers.

22. The one or more computing systems of claim 17 such that a guidance system of a platform with transmitters and receivers employs the machine learning system to input TOA information as the platform travels and output guidance information.

23. The one or more computing systems of claim 22 such that the guidance system determines a guidance instruction for the platform based on the TOA information.

24. The one or more computing systems of claim 22 such that the platform is a component of a robot control system.

25. The one or more computing systems of claim 22 such that the platform is a satellite and the object locations are locations of objects in space.

26. The one or more computing systems of claim 22 such that the platform is an unmanned vehicle.

27. The one or more computing systems of claim 17 such that the training TOA information is calculated during movement of a platform with transmitters and receivers through a volume of objects and object locations of the training collections are identified by an actual object location sensor.

28. The one or more computing systems of claim 27 such that the actual object location sensor is mounted on the platform.

29. The one or more computing systems of claim 27 wherein the actual object location sensor is external to the platform.

30. The method of claim 17 further comprising generating TOA information by simulating time-of-arrivals for training collections of object locations.

31. The one or more computing systems of claim 17 wherein the machine learning system is based on reinforcement learning.

32. The one or more computing systems of claim 17 wherein the machine learning system is based on supervised learning.

* * * * *